(12) United States Patent
Wang et al.

(10) Patent No.: US 12,105,838 B2
(45) Date of Patent: Oct. 1, 2024

(54) CROSS-DOMAIN FREQUENCY FILTERS FOR FRAUD DETECTION

(71) Applicant: Google LLC, Mountain View, CA (US)

(72) Inventors: Gang Wang, Jersey City, NJ (US); David Bruce Turner, Newark, CA (US)

(73) Assignee: Google LLC, Mountain View, CA (US)

( * ) Notice: Subject to any disclaimer, the term of this patent is extended or adjusted under 35 U.S.C. 154(b) by 264 days.

(21) Appl. No.: 17/617,370

(22) PCT Filed: Jan. 15, 2021

(86) PCT No.: PCT/US2021/013583
§ 371 (c)(1),
(2) Date: Dec. 8, 2021

(87) PCT Pub. No.: WO2022/154801
PCT Pub. Date: Jul. 21, 2022

(65) Prior Publication Data
US 2022/0414258 A1    Dec. 29, 2022

(51) Int. Cl.
*G06F 21/62* (2013.01)
*G06N 7/01* (2023.01)
(52) U.S. Cl.
CPC .......... *G06F 21/6245* (2013.01); *G06N 7/01* (2023.01)
(58) Field of Classification Search
CPC ... G06F 21/6245; G06F 21/6263; G06N 7/01; G06Q 30/0248
See application file for complete search history.

(56) References Cited

U.S. PATENT DOCUMENTS

| 8,526,603 | B2* | 9/2013 | Kerschbaum | H04L 9/302 |
| | | | | 380/30 |
| 8,533,206 | B1* | 9/2013 | Guha | G06F 16/9566 |
| | | | | 707/754 |

(Continued)

FOREIGN PATENT DOCUMENTS

| CN | 101448247 | 6/2009 |
| CN | 105850100 | 8/2016 |

(Continued)

OTHER PUBLICATIONS

Gurjar et al.; "A Privacy-Preserving Multi-keyword Ranked Search Scheme over Encrypted Cloud Data using MIR-tree", Dec. 2016, International Conference on Computing, Analytics and Security Trends, pp. 533-538. (Year: 2016).*

(Continued)

*Primary Examiner* — Matthew Smithers
(74) *Attorney, Agent, or Firm* — Fish & Richardson P.C.

(57) ABSTRACT

This disclosure relates to using probabilistic data structures to enable systems to detect fraud while preserving user privacy. In one aspect, a method includes obtaining a set of frequency filters. Each frequency filter defines a maximum event count for a specified event type over a specified time duration and corresponds to a respective content provider. A subset of the frequency filters are identified as triggered frequency filters for which an actual event count for the specified event type corresponding to the frequency filter exceeds the maximum event count defined by the frequency filter during a time period corresponding to a specified time duration for the frequency filter. A probabilistic data structure that represents at least a portion of the frequency filters in the subset of frequency filters is generated. A request for content is sent to multiple content providers. The request for content includes the probabilistic data structure.

20 Claims, 4 Drawing Sheets

(56) References Cited

U.S. PATENT DOCUMENTS

| | | | |
|---|---|---|---|
| 9,305,056 B1* | 4/2016 | Gupta | G06F 16/24552 |
| 10,223,393 B1* | 3/2019 | Noble | H04L 67/1097 |
| 10,642,994 B1* | 5/2020 | Allen | H04L 63/0428 |
| 10,853,359 B1* | 12/2020 | Waugh | G06F 16/24568 |
| 2008/0270628 A1* | 10/2008 | Nekovee | H04L 69/04 |
| | | | 709/247 |
| 2010/0280882 A1* | 11/2010 | Faith | G06Q 10/06375 |
| | | | 705/7.37 |
| 2014/0358671 A1* | 12/2014 | Wei | G06Q 30/0248 |
| | | | 705/14.45 |
| 2016/0048868 A1* | 2/2016 | Mirisola | G06Q 30/02 |
| | | | 705/14.44 |
| 2016/0092699 A1* | 3/2016 | Riva | H04L 63/0421 |
| | | | 726/26 |
| 2017/0193382 A1* | 7/2017 | Villa | G06F 16/2477 |
| 2017/0316455 A1 | 11/2017 | Fichter et al. | |
| 2019/0266273 A1* | 8/2019 | Karlapudi | G06F 16/278 |
| 2019/0361842 A1* | 11/2019 | Wood | G06V 30/418 |
| 2020/0349277 A1 | 11/2020 | Torbey | |
| 2021/0203682 A1* | 7/2021 | Bajpai | G06F 21/55 |

FOREIGN PATENT DOCUMENTS

| | | |
|---|---|---|
| CN | 112189199 | 1/2021 |
| JP | 2017-507387 | 3/2017 |
| JP | 2018-508918 | 3/2018 |

OTHER PUBLICATIONS

Jin et al.; "Content Routing and Lookup Schemes using Global Bloom Filter for Content-Delivery-as-a-Service", Mar. 2014, IEEE Systems Journal, vol. 8, No. 1, pp. 268-278. (Year: 2014).*

International Search Report and Written Opinion in International Appln No. PCT/US2021/013583, Oct. 8, 2021, 12 pages.

Office Action in Chinese Appln. No. 202180004120.7, dated Mar. 16, 2023, 13 pages (with English translation).

Notice of Allowance in Japanese Appln. No. 2021-576489, dated Apr. 10, 2023, 5 pages (with English translation).

Notice of Allowance in Chinese Appln. No. 202180004120.7, dated Jun. 19, 2023, 5 pages (with English translation).

Extended European Search Report in European Appln. No. 23155610.1, dated Mar. 9, 2023, 5 pages.

International Preliminary Report on Patentability in International Appln. No. PCT/US2021/013583, mailed on Jul. 27, 2023, 7 pages.

Notice of Allowance in European Appln. No. 23155610.1, mailed on Jul. 20, 2023, 9 pages.

Notice of Allowance in European Appln. No. 21704364.5, mailed on Aug. 18, 2022, 7 pages.

Office Action in Japanese Appln. No. 2023-077364, mailed on May 13, 2024, 4 pages (with English translation).

* cited by examiner

CROSS-DOMAIN FREQUENCY FILTERS FOR FRAUD DETECTION

CROSS-REFERENCE TO RELATED APPLICATIONS

This application is a National Stage Application under 35 U.S.C. § 371 and claims the benefit of International Application No. PCT/US2021/013583, filed Jan. 15, 2021, entitled CROSS-DOMAIN FREQUENCY FILTERS FOR FRAUD DETECTION. The disclosure of the foregoing application is incorporated herein by reference in its entirety.

TECHNICAL FIELD

This specification is related to data processing and preserving user privacy when collecting and analyzing user data for the purposes of fraud detection and mitigation.

BACKGROUND

Probabilistic data structures are data structures that use hash functions to represent a set of elements. One example probabilistic data structure is a Bloom filter, which is a bit array of m bits.

SUMMARY

In general, one innovative aspect of the subject matter described in this specification can be embodied in methods that include obtaining a set of frequency filters. Each frequency filter defines a maximum event count for a specified event type over a specified time duration and corresponds to a respective content provider. A subset of the frequency filters are identified as triggered frequency filters for which an actual event count for the specified event type corresponding to the frequency filter exceeds the maximum event count defined by the frequency filter during a time period corresponding to a specified time duration for the frequency filter. A probabilistic data structure that represents at least a portion of the frequency filters in the subset of frequency filters is generated. A request for content is sent to multiple content providers. The request for content includes the probabilistic data structure. Other implementations of this aspect include corresponding apparatus, systems, and computer programs, configured to perform the aspects of the methods, encoded on computer storage devices.

These and other implementations can each optionally include one or more of the following features. In some aspects, the probabilistic data structure is a Bloom filter that includes a bit array. Generating the probabilistic data structure can include, for each frequency filter in the subset of triggered frequency filters, obtaining, for each of one or more hash functions, a bit position for the triggered frequency filter by applying the hash function to a filter identifier for the frequency filter and setting each bit position in the bit array to a value of one.

In some aspects, obtaining the set of frequency filters comprises receiving, for each frequency filter, and encrypted token generated by encrypting a token that defines a filter identifier for the frequency filter, the maximum event count for the specified event type, and the specified time duration for the frequency filter. The filter identifier can include a byte array that identifies at least one of (i) a digital component corresponding to the specified event type, (ii) a content platform corresponding to the specified event type, or (iii) the specified event type.

Some aspects include updating the actual event count for a given frequency filter in the set of frequency filters. The updating can include obtaining the filter identifier for the given frequency filter in response to an occurrence of the specified event type for the given frequency filter; initiating an Application Programming Interface (API) call to a web browser API for updating the actual event count for the given frequency filter, where the API call comprises the encrypted token for the given frequency filter; decrypting, by the web browser, the encrypted token; and updating, by the web browser, the actual event count for the given frequency filter.

Some aspects include detecting, for a given frequency filter, an occurrence of an event of the specified event type defined by the given frequency filter and updating the actual event count for the given frequency filter.

In some aspects, generating the probabilistic data structure includes selecting, randomly or pseudorandomly, one or more frequency filters in the subset of triggered frequency filters; removing a filter identifier for each of the one or more frequency filters from a subset of filter identifiers corresponding to the subset of triggered frequency filters prior to generating the probabilistic data structure; and generating the probabilistic data structure using the subset of filter identifiers.

In some aspects, generating the probabilistic data structure includes selecting, randomly or pseudorandomly, one or more frequency filters that are not in the subset of triggered frequency filters; adding a filter identifier for each of the one or more frequency filters to a subset of filter identifiers corresponding to the subset of triggered frequency filters prior to generating the probabilistic data structure; and generating the probabilistic data structure using the subset of filter identifiers.

In some aspects, generating the probabilistic data structure includes selecting, randomly or pseudorandomly, one or more first frequency filters in the subset of triggered frequency filters; selecting, randomly or pseudorandomly, one or more second frequency filters that are not in the subset of triggered frequency filters; prior to generating the probabilistic data structure: removing a filter identifier for each of the one or more first frequency filters from a subset of filter identifiers corresponding to the subset of triggered frequency filters; and adding a filter identifier for each of the one or more second frequency filters to the subset of triggered frequency filters prior to generating the probabilistic data structure; and generating the probabilistic data structure using the subset of filter identifiers.

Some aspects include determining a similarity between the probabilistic data structure and a second probabilistic data structure by performing set intersections on the probabilistic data structure and the second probabilistic data structure.

Some aspects include receiving, by a content provider of the multiple content providers, the request for content comprising the probabilistic data structure and determining, by the content provider, a response to the request based on the probabilistic data structure. If it is determined that one or more of the triggered frequency filters corresponds to a frequency filter of the content provider, not providing the requested content.

In general, third-party cookies can be used to monitor the frequency of requests for, impressions of, and/or user interactions with, content, e.g., digital components, across multiple domains. These frequencies can be used to detect online fraud, such as fraud that occurs when malware in a browser generates excessive amounts of fraudulent requests, impressions, and/or user interactions across multiple domains in a short period of time. A third-party cookie can be set by a website other than the website that a user is currently viewing and can be used to collect user data across multiple domains. However, as some browsers may not support third-party cookies, such techniques for monitoring the frequency of requests, impressions, and/or user interactions for fraud detection purposes are not possible with such browsers. The use of first-party cookies, which are set by the website that the user is currently viewing, may not detect situations in which malware generates excessive amounts of requests, impressions, and/or user interactions in a short period of time across multiple domains. For example, the use of first-party cookies may only detect the amounts at the one domain, which can be a small amount of the events, while the amounts across many domains is large within the time period.

The subject matter described in this specification can be implemented in particular embodiments so as to realize one or more of the following advantages. Using probabilistic data structures as described in this document enables systems to detect fraudulent online activity generated across multiple domains, while preserving user privacy and maintaining user data security with respect to user data. The use of a probabilistic data structure enables browsers or other applications to report frequency filters for which a corresponding count (e.g., request, impression, and/or user interaction counts) has been exceeded without providing such data in cleartext, which would otherwise expose the domains/entities to which the user's browser or application is sending requests. The probabilistic data structure can instead enable content providers to query whether their frequency filters have been triggered (e.g., its maximum event count has been exceeded) without being able to determine whether any other content platform's frequency filters have been triggered. This also enables fraud detection while performing the counting at the user's client device, rather than aggregating such cross-domain information elsewhere, therefore preventing entities from tracking the user's activity across multiple domains. By counting events at the client device and using frequency filters provided to the client device, excess quantities of events can be detected across multiple publisher domains without providing cross-domain information (e.g., information identifying websites on multiple domains that a user visited) outside of the client device. As probabilistic data structures are compact, the use of compact data structures for reporting triggered frequency filters reduces bandwidth consumption, data storage requirements, and battery power consumption (e.g., of mobile devices), when transmitting the report.

Differential privacy techniques can be used to further enhance user privacy. As the client device can send many requests during a time period during which the same frequency filters have been triggered, a static probabilistic data structure can otherwise be used as a fingerprint that would enable recipients of requests that include the probabilistic data structure to track the user across the multiple requests. The combined techniques of counting events at the client device rather than at content provider servers and using the counts to trigger frequency filters, using probabilistic data structures to represent the triggered frequency filters, and applying differential privacy techniques to a set of triggered frequency filters prior to generating the probabilistic data structures provides a synergistic effect of preserving user privacy while enabling content providers or other systems to detect fraudulently generated events, e.g., across multiple domains.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document relates to using probabilistic data structures to enable systems to detect fraud while preserving user privacy. An application, e.g., browser, running on a client device can maintain event counts that correspond to frequency filters for various content providers. A frequency filter can correspond to a specified event type and one or more of a digital component or a content provider that distributes the digital component. The frequency filter can define a maximum event count for the specified event type that, when exceeded over a specified time duration, can indicate fraudulent activity. For example, a content provider can configure a frequency filter to define that more than 10 requests for digital components sent from the application to the content provider over the course of an hour is an indicator of potential fraud.

The probabilistic data structure can be used to report the triggered frequency filters to multiple content providers without the content providers being able to learn about the frequency filters of other content providers and without providing information about the user's online activity, e.g., without providing information about the user's cross-domain activity. When a maximum event count for a frequency filter is exceeded, thereby triggering the frequency filter, the application can add an entry to the probabilistic data structure for the frequency filter. The entry can be a bit of a bit array, e.g., by setting a bit of a Bloom filter to a value one in a bit position corresponding to a hash of a filter identifier for the Bloom filter. Other probabilistic data structures, e.g., Cuckoo filters, can also be used.

The application running on the user's device can send the probabilistic data structure to multiple content providers, e.g., in response to a frequency filter being triggered, along with a request for content sent by the user's device, or with another communication. Each content provider can query the probabilistic data structure by computing hashes of the filter identifier for each of its frequency filters and determining whether the resulting bit positions have a value of one. In this way, the only information that each content provider can obtain from the probabilistic data structure is whether one or more of its frequency filters have been triggered. If a frequency filter has been triggered, the content provider can conclude that the client device or application has been compromised or otherwise generating fraudulent events.

Figure 1:
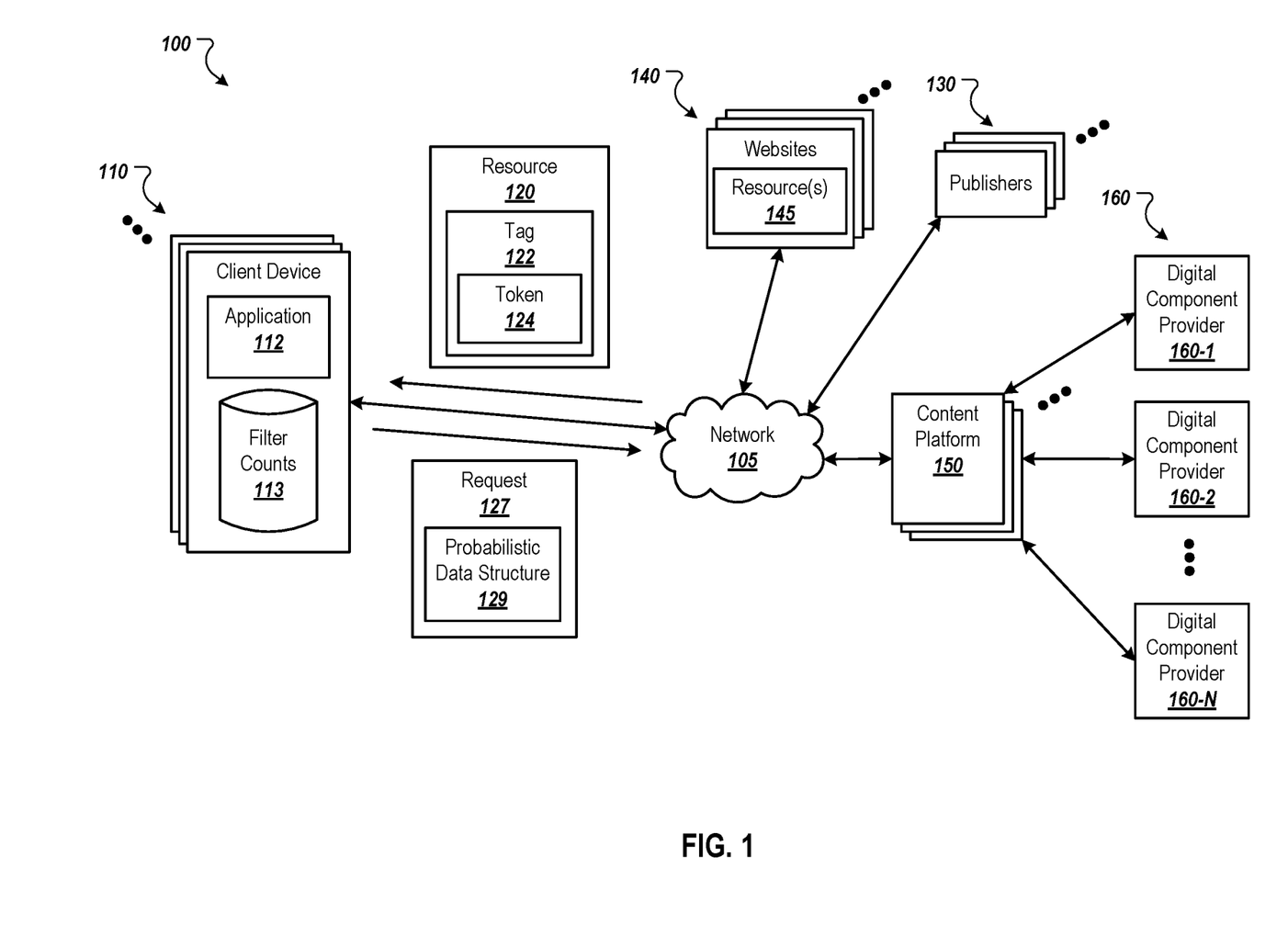
FIG. 1 is a block diagram of an environment in which frequency filters are used to detect fraud.

FIG. 1 is a block diagram of an environment 100 in which frequency filters are used to detect fraud. The example environment 100 includes a data communication network 105, such as a local area network (LAN), a wide area network (WAN), the Internet, a mobile network, or a combination thereof. The network 105 connects client devices 110, content platforms 150, publishers 130, and websites 140. The environment 100 can include many client devices 110, content platforms 150, websites 140, and publishers 130.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming system, or a virtual reality system.

A client device 110 typically includes applications 112, such as web browsers and/or native applications, to facilitate the sending and receiving of data over the network 105. A native application is an application developed for a particular platform or a particular device (e.g., mobile devices having a particular operating system).

Some resources, application pages, or other electronic content can include digital component slots for presenting digital components with the resources 145 or application pages. In some implementations, an electronic resource 120 can include a tag 122 for each digital component slot. The tag 122 can include code, e.g., scripts, that initiate a request for a digital component from a content platform 150 and causes the application 112 to present the digital component in the digital component slot. As described below, the tag 122 can also include a token 124 or code that, when executed by the client device 110, causes the client device 110 to obtain the token 124 from the token owner, e.g., a content platform 150 or digital component provider 160.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for display to a user of the client device 110. The application 112 can request digital components from one or more content platforms 150.

Content platforms 150 can select and distribute digital components for display with webpages, native application content, and/or other electronic resources or content. The content platforms can include supply-side platforms (SSPs) and/or demand-side platforms (DSPs). Some publishers 130 use an SSP to manage the process of obtaining digital components for digital component slots of its resources and/or applications. An SSP is a technology platform implemented in hardware and/or software that automates the process of obtaining digital components for the resources and/or applications. Each publisher 130 can have a corresponding SSP or multiple SSPs. Some publishers 130 may use the same SSP.

Digital component providers 160 can create (or otherwise publish) digital components that are displayed in digital component slots of publisher's resources and applications. The digital component providers 160 can use a DSP to manage the provisioning of its digital components for display in digital component slots. A DSP is a technology platform implemented in hardware and/or software that automates the process of distributing digital components for display with the resources and/or applications. A DSP can interact with multiple supply-side platforms SSPs on behalf of digital component providers 160 to provide digital components for display with the resources and/or applications of multiple different publishers 130. In general, a DSP can receive requests for digital components (e.g., from an SSP), generate (or select) a selection value for one or more digital components created by one or more digital component providers 160 based on the request, and provide data related to the digital component (e.g., the digital component itself) and the selection parameter to an SSP. The selection value can indicate an amount that the digital component provider 160 is willing to provide for display or user interaction with the digital component. The SSP can then select a digital component for display at a client device 110 and provide, to the client device 110, data that causes the client device 110 to display the digital component. The content platforms 150, digital component providers 160, and publishers 130 can also be referred to as content providers in this document.

The application 112 can receive frequency filters from content providers and use the frequency filters to determine when maximum event counts defined by the frequency filters have been exceeded during time durations corresponding to the frequency filters. As described in more detail below, a content provider can provide a frequency filter in the form of a token 124, e.g., along with a tag 122 of an electronic resource 120. The token 124 can be encrypted such that only the client device 110 or application 112 can decrypt then access the information of the token 124.

For each received frequency filter, the application 112 can initialize and maintain an event count corresponding to the specified event type of the frequency filter. When the maximum event count of a frequency filter is exceeded for the time frame defined by the frequency filter, e.g., most recent hour, thereby triggering the frequency filter, the application 112 can add the frequency filter to a set of triggered frequency filters. To report such triggered frequency filters to content providers so that the content providers can determine whether the events being generated by the application 112 are fraudulent or potentially fraudulent, the application 112 can generate a probabilistic data structure 129 and send the probabilistic data structure 129 to the content providers. Examples of probabilistic data structures include Bloom filters and Cuckoo filters.

In some implementations, the application 112 includes the probabilistic data structure 129 in requests 127 for content sent by the client device 110 to the content providers. In this way, the content providers can use the probabilistic data structure to evaluate whether the events are fraudulent and respond (or not respond) to the request based on the evaluation.

Figure 2:
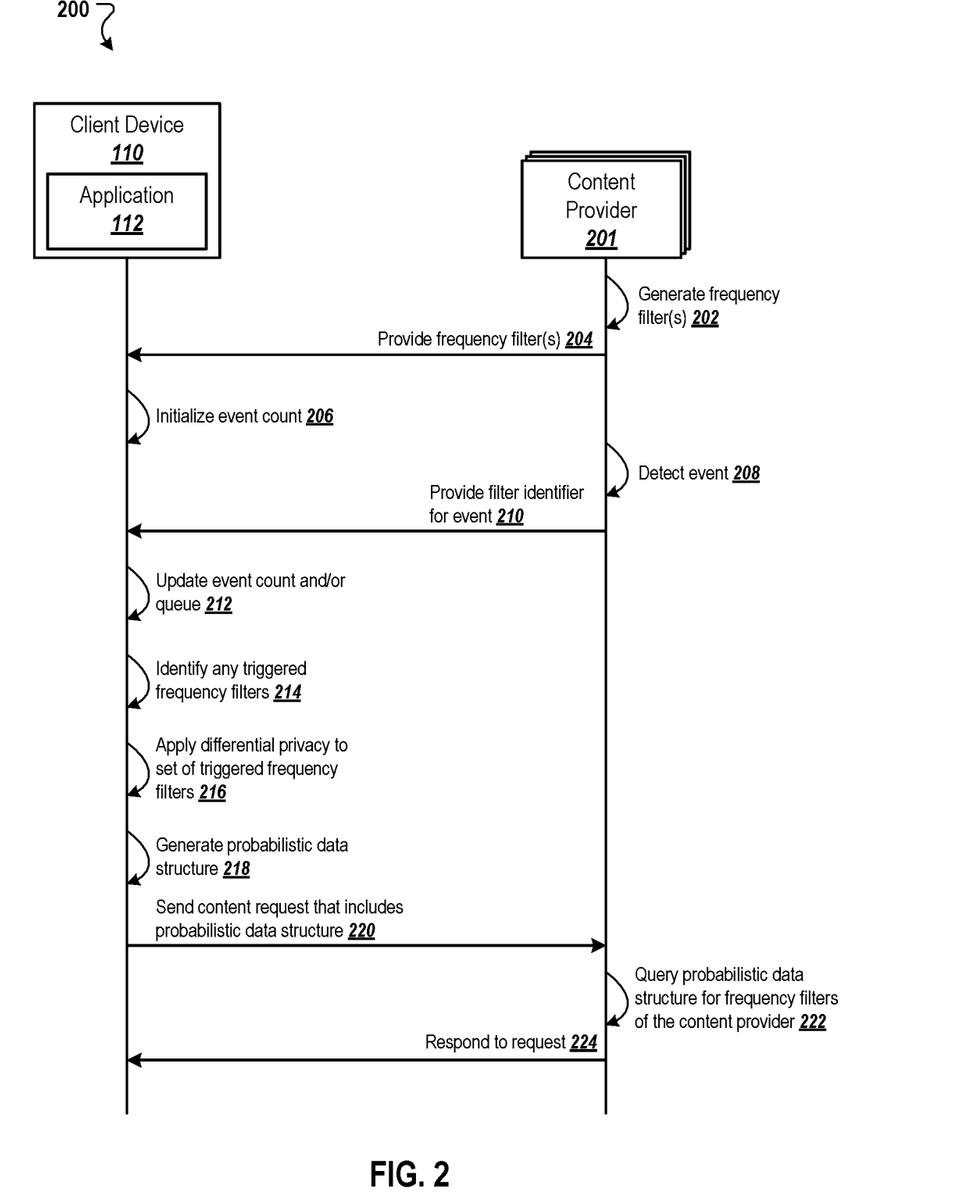
FIG. 2 is a swim lane diagram of an example process for generating a probabilistic data structure based on frequency filters and using the probabilistic data structure to detect fraud.

FIG. 2 is a swim lane diagram of an example process 200 for generating a probabilistic data structure based on frequency filters and using the probabilistic data structure to detect fraud. Operations of the process 200 can be implemented, for example, by the client device 110 and content providers 201, e.g., one or more servers of each content provider 201. Operations of the process 200 can also be implemented as instructions stored on one or more computer readable media which may be non-transitory, and execution of the instructions by one or more data processing apparatus can cause the one or more data processing apparatus to perform the operations of the process 200. In FIG. 2, the content providers 201 can include, for example, content platforms 150, digital component providers 160, and/or publishers 130.

The content providers generate frequency filters (202). A frequency filter can include, as parameters, at least a specified event type and a maximum event count for the specified event type. Each frequency filter can belong to an owner content provider 201 for which the frequency filter was provided to the client device 110. The frequency filter can also define the subject of the specified event type. For some events, the subject can be a particular digital component, while for other events the subject can be a content provider.

For example, the specified event type can be an impression of (e.g., the display of) any digital components provided by the content provider 201, or a user interaction with, e.g., click or selection of, any digital components provided by the content provider 201. In this example, the subject of the frequency filter is the digital component and the specified event type is either an impression or a user interaction.

In another example, the specified event type can be a request for a digital component sent from the client device 110 to the owner content provider 201. In this example, the specified event type is a digital component request and the subject of the frequency filter is the owner content provider.

In another example, the specified event type can be a request for an electronic resource sent to a publisher domain. In this example, the specified event type is a resource request and the subject of the frequency filter is the particular publisher corresponding to the domain. In another example, the specified event type can be a display of any electronic resources (e.g., a page view for a web page). In this example, the specified event type is the resource display and the subject is the particular publisher.

A frequency filter can also include, as a parameter, a specified time duration for the frequency filter. This time duration can define a lookback window of time for the application 112 of the client device 110 to consider when determining whether an actual event count exceeds the maximum event count of the frequency filter. For example, if the specified time duration is 24 hours, when identifying the frequency filters to represent in a probabilistic data structure, the application 112 would determine the actual number of occurrences of the specified event type over the past 24 hours looking back from the current time and compare that number of occurrences to the maximum event count of the frequency filter.

Each frequency filter can have a filter identifier that uniquely identifies the frequency filter. The owner content provider 201 can specify the filter identifier. In some implementations, the owner content provider 201 can encode additional information into the filter identifier for use by the application 112 of the client device 110. For example, the filter identifier can encode the specified event type and the subject of the specified event type.

In some implementations, the filter identifier is in the form of a byte array, e.g., that is fixed to a particular data size, e.g., 16 bytes, 32 bytes, 64 bytes, or another appropriate data size. The byte array can encode the additional information, e.g., the specified event type and/or the subject of the frequency filter identified by the filter identifier.

The content providers 201 can define the parameters of their frequency filters and generate, for each frequency filter, a data structure that includes the parameters. The data structure can be in the form of a token, e.g., an encrypted token. For example, the content provider 201 can generate the token, encrypt the token using a public key of the application 112 of the client device 110 to which the token is being sent, and send the encrypted token to the client device 110. In this way, only the application 112 can decrypt the token using the corresponding private key.

The token for a frequency filter can include the parameters of the frequency filter, e.g., the specified event type, the subject, and the specified time duration. For example, the token can include the filter identifier for the frequency filter, the specified event type (which can be encoded in the filter identifier), the subject of the frequency filter (which can be encoded in the filter identifier), and the specified time duration for the frequency filter.

The token can also optionally include additional data that can be used to detect and/or prevent attacks and/or other fraudulent activity, as described in more detail below. For example, the token can include a resource locator for the owner content provider 201, a token creation time, a hash of the public key of the application 112 for which the frequency filter is intended, and/or a digital signature of the rest of the content of the token (e.g., the content other than the signature itself). The resource locator can be the eTLD+1 for a domain of the owner content provider. The eTLD+1 is the effective top-level domain (eTLD) plus one level more than the public suffix. An example eTLD+1 is "example.com" where ".com" is the top-level domain.

The token creation time can indicate a time at which the token is created. This time can be a high resolution time, e.g., to the milliseconds. This enables the application 112 to verify the freshness of the token, e.g., whether the token was created within a threshold duration of time from a time at which the token was received, and to detect possible replay attacks.

The public key of the application 112 can be used by the application 112 to verify that it is the application 112 to which the token was intended. The application 112 can use its own private key to decrypt the token if the content provider encrypted the token with the application 112's public key.

The digital signature can be generated by the owner content provider 201 using a private key of the owner content provider 201. For example, the owner content provider 201 can sign over the rest of the content of the token using the private key. The application 112 can download, e.g., from the owner content provider 201, the corresponding public key and use the public key to verify that none of the content of the token was modified after the token was created. For example, the application 112 can attempt to verify the digital signature using the public key of the content provider 201 and the rest of the content of the token. If this verification fails, the application 112 can determine that the content has been modified.

A content provider 201 can generate multiple frequency filters for various purposes. For example, a content provider 201 can generate a first frequency filter for impressions of any digital components provided by content provider 201 and a second frequency filter for user interactions with any digital components provided by content provider 201. The content provider 201 can also generate a third frequency filter for requests to the content provider from the particular client device 110.

In another example, a content provider 201 can generate multiple frequency filters for the same specified event type and the same subject, but with different maximum event counts. For example, a content provider 201 can consider different event counts as having a different likelihood of fraud and generate a frequency filter for each level of fraud. This enables the content provider 201 to determine the likelihood of fraud occurring at the client device 110. For example, the content provider 201 can generate a first frequency filter for impressions of any digital components provided by content provider 201 with a maximum event count of 5 impressions in a specified time duration of one hour to indicate a moderate likelihood of fraud. The content provider 201 can also generate a second frequency filter for impressions of any digital components provided by content provider 201 with a maximum event count of 10 impressions in a specified time duration of one hour to indicate a high likelihood of fraud. These quantities are only examples and other quantities could be used for detecting fraud.

The content providers 201 provide their frequency filter(s) to the client device 110 (204). For example, each content provider 201 can transmit its encrypted tokens to the client device 110 over a network, e.g., the network 105 of FIG. 1. As described above with reference to FIG. 1, a content provider 201 can provide an encrypted token with a tag 122 of an electronic resource 120. In other examples, the content providers 201 can send the encrypted tokens directly to the client device 110, e.g., in separate communications from those that carry tags 122.

The application 112 initializes an actual event count for each received frequency filter (206). Upon receiving an encrypted token, the application 112 can decrypt the encrypted token to recover the cleartext content of the token, e.g., the parameters of the frequency filter. Cleartext is text that is not computationally tagged, specially formatted, or written in code, or data, including binary files, in a form that can be viewed or used without requiring a key or other decryption device, or other decryption process. The application 112 can decrypt an encrypted token using the private key corresponding to the public key used to encrypt the token. The application 112 can initialize and maintain a dedicated queue for each filter identifier, i.e., for each received frequency filter. The queue for a filter identifier can be a queue of timestamps when an occurrence of the specified event type of the frequency filter has been detected. For example, when an occurrence of an event of the specified event type is detected, the application 112 can add the timestamp that indicates the time at which the event of the specified event type occurred to the queue. The queue enables the application 112 to count the number of actual occurrences of the specified event type during a lookback window defined by the specified time duration for the frequency filter.

An occurrence of an event of the specified event type for a frequency filter is detected (208). In some implementations, the owner content provider 201 can detect the occurrence of the event of the specified event type based on data received from the application 112. For example, if the specified event type is a request for a digital component, the owner content provider can determine that the event occurred based on receiving a request for a digital component from the application 112. In another example, if the specified event type is an impression of a digital component or a user interaction with a digital component, the owner content provider can detect the occurrence of the specified event type based on a report received from the application 112 indicating that the impression or user interaction occurred. In either case, the owner content provider 201 can obtain from the data received from the application 112 data identifying the subject of the data (e.g., the digital component or digital component request) and the event type and map these to the corresponding frequency filter(s) and the corresponding filter identifier(s) or recreate the frequency identifier(s) using the subject and event type (e.g., by creating a byte array that includes the subject and the specified event type).

The owner content provider 201 can provide the filter identifier(s) corresponding to the detected event to the application 112 (210). In some implementations, the content providers 201 obfuscate the filter identifier prior to sending the filter identifier to the application 112 to protect the security of confidential information. To obfuscate the filter identifier, the content provider 201 can apply additional cryptographic transformation to the filter identifier. For example, content provider 201 can maintain a secret key and apply a hash-based message authentication code (HMAC) hash function to the filter identifier to transform the filter identifier. This can be represented as transformed_filter_id=HMAC(filter_id, secret_key), where "transformed_filter_id" is the transformed filter identifier, "filter_id" is the filter identifier before transformation, "secret_key" is the secret key of the content provider, and HMAC is the hash function.

In another example, the content provider 201 can transform the filter identifier using deterministic symmetric key encryption and a secret key of the content provider 201. This can be represented as transformed_filter_id=Encrypt$_{deterministic}$ (filter_id, secret_key), where "transformed_filter_id" is the transformed filter identifier, "filter_id" is the filter identifier before transformation, "secret_key" is the secret key of the content provider, and Encrypt$_{deterministic}$ is the deterministic symmetric key encryption algorithm.

In another example, the content provider 201 can generate an application-specific filter identifier that is specific to the instance of the application 112 running on the particular client device 110. In this example, the content provider 201 can use the application's public key to transform the filter identifier. For example, the content provider 201 can use the application's public key in place of the content provider's secret key in the HMAC technique described above, which can be represented as transformed_filter_id=HMAC(filter_id, application_public_key). In this example, "application_public_key" is the application's public key.

In another example, the content provider 201 can combine the above approaches to further obfuscate the filter identifier. For example, the content provider 201 can transform the filter identifier by applying the HMAC function to the transformed identifier resulting from the deterministic symmetric key encryption algorithm, which can be represented as transformed_filter_id=HMAC(Encrypt$_{deterministic}$(filter_id, secret_key), application_public_key). In this example, the HMAC function uses the application's public key. In another example, the content provider 201 can transform the filter identifier by applying a second HMAC function using the application's public key to the transformed filter identifier resulting from applying the HMAC function to the filter identifier using the secret key of the content provider, which can be represented as "transformed_filter_id=HMAC(HMAC(filter_id, secret_key), application_public_key).

In some implementations, the event is detected at the client device 110, e.g., by the application 112 or the client device 110. For example, a browser can determine that a request for an electronic resource matches a frequency filter based on the URL or domain to which the request is being sent matching the domain of a frequency filter. In another example, the application 112 can determine that an impression of, or user interaction with, a digital component matches a frequency filter based on a digital component identifier included in metadata of the digital component that the application receives, or other matching criteria defined by the frequency filter, matches a digital component identifier of a frequency filter. The application 112 can also determine that the event that occurred, e.g., impression, matches the specified event type, e.g., impression, defined by the frequency filter.

The application 112 updates the event count and/or the queue for the frequency filter (212). If the content provider 201 detects the event, the application 112 can update the event count and/or queue upon receiving the filter identifier for the frequency filter. For example, the application 112 can add a timestamp to the queue for the frequency filter identified by the filter identifier. The timestamp can indicate the time at which the filter identifier was received from the content provider 201 to indicate that the event had been detected. In another example, the timestamp can indicate the time at which the event was detected, which can be included in a message sent by the content provider 201 along with the filter identifier to report the occurrence of the event.

The application 112 can also update an event count by counting the number of timestamps that are in the queue and that are within a lookback time window. The lookback time window is based on the specified time duration for the frequency filter. The starting time for the lookback window is the time resulting from subtracting the specified time duration from the current time. The end time for the lookback window is the current time. For example, if the specified time duration is one hour and the current time is 11:00 AM, the lookback window would be from 10:00 AM to 11:00 AM. The application 112 can identify the timestamps in the queue for the filter identifier and determine a quantity of these timestamps. For example, if the queue includes a timestamp of 9:32 AM, a timestamp of 10:16 AM, and a timestamp of 10:58 AM (indicating the occurrence of the specified event type three times), the actual event count would be two as only two of the three timestamps are within the lookback window.

Importantly, the timestamps included in the queue for a frequency filter corresponding to a digital component, content platform, or digital component provider are not limited to any particular publisher domain. Any occurrence of the specified event type can be detected and included in the queue independent of the publisher domain for which a digital component request was generated or with which a digital component was displayed. That is the queue for a content provider's frequency filter can include a timestamp for an impression of a digital component with a first website and a timestamp for an impression of the digital component with a second, different, website. However, the queue can store just the timestamp of the events, without storing any publisher domain information. In this way, the queue can be used to determine the actual event count across multiple publisher domains without providing content platforms access to cross-domain online activity of the user of the application 112. This method therefore provides improved user data security as the updating of an event count is performed centrally by the application 112 itself, and without requiring any domains to have knowledge of event occurrences of other domains. Thus, such data need not be shared with, or transmitted to, other domains for the purposes of obtaining a correct event count across multiple content providers.

In some implementations, an application programming interface (API) of the application 112 is used to update the queue and/or actual event count for a filter identifier. For example, a tag 122 can initiate an API call to a web browser API for updating the actual event count. The API call, which can be referred to as IncrementFrequencyCount can include the encrypted token, e.g., IncrementFrequencyCount(encrypted token). The browser can decrypt the encrypted token and update the queue/actual event count, as described above.

The application 112 can receive frequency filters, initialize queues, and update the queues over time based on data received from the content providers 201. Whenever the application 112 is to report frequency filters that have been triggered, the application 112 can identify any triggered frequency filters (214). For example, the application 112 can determine whether any frequency filters are currently triggered in response to determining that a content request, e.g., a digital component request, is about to be sent to content providers 201. A triggered frequency filter is a frequency filter for which the actual event count for the frequency filter exceeds the maximum event count for the frequency filter during the current lookback window.

The application 112 can identify any triggered frequency filters by determining the actual event count, as described with reference to step 212, and compare the actual event count against the maximum event count defined by the frequency filter. If the application 112 determines that the actual event count exceeds the maximum event count, the application 112 can determine that the frequency filter is triggered. The application 112 can identify a set of zero or more triggered frequency filters using the comparisons for each frequency filter for which the application 112 is maintaining a queue. The application 112 can generate a set of zero or more filter identifiers corresponding to the triggered frequency filters. That is, the set of filter identifiers includes the filter identifier for each triggered frequency filter, if any. The set of filter identifiers can be a subset, e.g., a proper subset, of the filter identifiers for all of the frequency filters for which the application 112 is maintaining a queue or otherwise monitoring. A proper subset is a subset of a set, but does not include all members of the set.

The application 112 can apply differential privacy techniques to the set of triggered frequency filters prior to generating a probabilistic data structure that represents the filter identifiers for the triggered frequency filters (216). This is optional, but can enhance the protection of user privacy by preventing a static probabilistic data structure from being used as a fingerprint for the user. For example, if the application 112 applies differential privacy techniques prior to generating each probabilistic data structure, or periodically, the probabilistic data structures will differ and therefore cannot be used as a fingerprint.

The differential privacy techniques can include removing one or more filter identifiers from the set of filter identifiers and/or adding one or more filter identifiers to the set of filter identifiers. The application 112 can select the one or more filter identifiers to add to the set of filter identifiers randomly or pseudorandomly. Similarly, the application 112 can select the one or more filter identifiers to remove from the set of filter identifiers randomly or pseudorandomly. By adding a filter identifier randomly or pseudorandomly, the probabilistic data structure can change per request even if there are no changes in the list of triggered frequency filters, thereby preventing fingerprinting and tracking for non-compromised client devices 110.

Let D represent the set of filter identifiers for the triggered frequency filters. The application 112 can randomly select $D^-$, where $D^- \subset D$. That is, $D^-$ represents a proper subset of the filter identifiers in the set of filter identifiers. The application 112 can also randomly or pseudorandomly select $D^+$, where $D^+ \cap D = \{ \}$. That is, $D^+$ represents one or more filter identifiers that are not in D, e.g., such that an intersection between D and a' is an empty set. In this example, the application 112 can generate a set of filter identifiers $D_i$ for generating a probabilistic data structure based on $D_i \in D \cup D^+ - D^-$.

The application 112 generates a probabilistic data structure using the set of filter identifiers (218). In some implementations, the probabilistic data structure is a Bloom filter. A Bloom filter is bit array of m bits. Initially, each bit is set to a value of zero. To populate the Bloom filter, the application 112 can apply k hash functions to each filter identifier in the set of filter identifiers. The result of each hash function is a bit position in the bit array of the Bloom filter. For each filter identifier, the application 112 can use the k hash functions to identify k bit positions in the array and set each of the k bit positions to a value of one. Using Bloom filters enables the application 112 to represent triggered frequency filters for multiple content providers 201 in a single data structure in a way that prevents each content provider 201 from accessing information about frequency filters of any other content provider 201. Thus, user data security is improved by only allowing content providers to access information relating to their own frequency filters.

The application 112 sends the probabilistic data structure to multiple content providers 201 (220). For example, the application can send the probabilistic data structure to the content providers along with a request for content, e.g., a request for a digital component.

Each content provider 201 queries the probabilistic data structure for frequency filters of the content provider 201 (222). To query a Bloom filter, a content provider 201 can apply the k hash functions to each of its filter identifiers and check the bit position resulting from each hash function. If all bit positions for all hash functions applied to a filter identifier have a value of one, then the content provider 210 can determine that the frequency filter is likely to have been triggered. However, as Bloom filters have a false positive rate and differential privacy may have been applied, it may not be a guarantee that the frequency filter was triggered. If any of the bit positions for a frequency filter across all k hash functions has a value of zero, then it is unlikely that the frequency filter was triggered.

Each content provider 201 can determine a response to a content request based on whether or not one of its frequency filters has been triggered. For example, if one or more frequency filters have been triggered, a content provider 201 can consider the request to potentially be fraudulent. In such cases, the content provider 201 can determine to not respond to the content request, or can respond in a different way than if no frequency filters were triggered. For example, if the response to the request would include a selection value to provide for a digital component, e.g., to an SSP, the content provider 201 can provide a lower selection value than the content provider would normally provide based on the frequency filter being triggered. In another example, the content provider can determine the response based on the number of its frequency filters that have been triggered at the client device 110. For example, the content provider 201 can reduce the selection value according to the number of triggered frequency filters.

In some implementations, a content provider 201 can choose to store the probabilistic data structures and then evaluate the probabilistic data structures offline. This can enable the content provider 201 to evaluate the history of triggered frequency filters for a particular instance of the application 112 running on a particular client device 110 and/or the history of the frequency filter across multiple client devices 110 to better detect fraud and/or to tune the maximum event counts of the frequency filters.

The content providers 201 respond to the request (224). For example, the content providers 201 can provide content or data for obtaining content based on whether any frequency filters of the content provider 201 have been triggered.

As described above, the data structure, e.g., encrypted token, for a frequency filter can include additional data to prevent attacks. For example, a malicious party may attempt to falsify an encrypted token and invoke the API of the application to increment the event count for a frequency filter an arbitrary number of times on applications where the malicious party's code, e.g., scripts, may run. Doing so can severely disrupt a content provider's normal operation. The malicious party may then demand a ransom.

One option to prevent such an attack is for the owner content provider to digitally sign the token with additional data, e.g., the owner domain (e.g., eTLD+1), token creation time, a hash of the public key (or the public key itself) of the application 112 for which the frequency filter is intended, and a digital signature of the token content. The application 112 can verify the digital signature by downloading the corresponding public key from a well-known location within the domain of the content provider. The application 112 can detect stale or duplicated requests, as well as possible replay attacks using the token creation time. The application 112 can also detect misdirected requests by verifying the hash of the public key. If the hash does not match a hash of the application's public key, then the request may have been intended for a different instance of the application running on a different device.

Another approach is for the application 112 to only invoke the API for incrementing the event count for a frequency filter from an iframe with the content provider's origin. The pair {caller_origin, filter_id} or $HMAC_{SHA256}$(caller_origin, filter_id) enables the application 112 to uniquely identify each cross-domain frequency filter. In these examples, "caller_origin" is the origin of the iframe and $HMAC_{SHA256}$ is an HMAC hash function.

Figure 3:
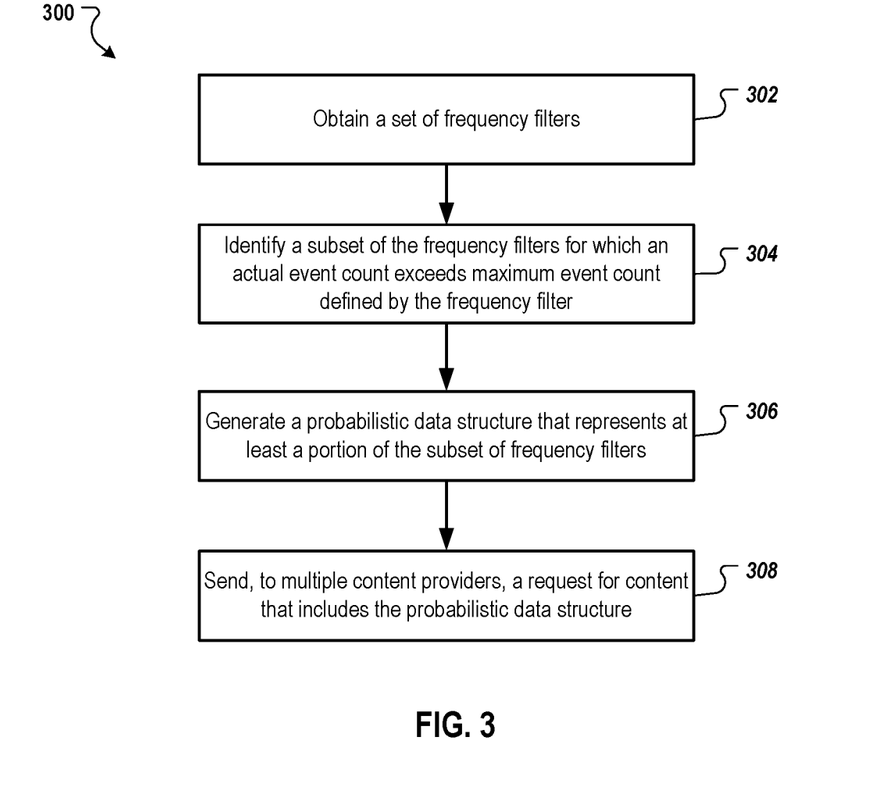
FIG. 3 is a swim lane diagram of an example process for generating a probabilistic data structure based on frequency filters and sending the probabilistic data structure to content providers.

FIG. 3 is a flow diagram of an example process 300 for generating a probabilistic data structure based on frequency filters and sending the probabilistic data structure to content providers. Operations of the process 300 can be implemented, for example, by a client device, e.g., the client device 110 of FIG. 1. Operations of the process 300 can also be implemented as instructions stored on one or more computer readable media which may be non-transitory, and execution of the instructions by one or more data processing apparatus can cause the one or more data processing apparatus to perform the operations of the process 300. For brevity and ease of description, the process 300 is described as being performed by the client device 110.

The client device 110 obtains a set of frequency filters (302). Each frequency filter can define a specified event type, a maximum event count for the specified event type, and a specified time duration for a lookback window for the frequency filter. Each frequency filter can also include a filter identifier, which in some implementations can encode the specified event type and a subject of the specified event type. As described above, a content provider can send a frequency filter to the client device 110 in the form of an encrypted token. The encrypted token can also include additional information that can be used to detect attacks. For example, the encrypted token can include a token creation time, a hash of a public key of an application 112 running on the client device, the eTLD+1 of the content provider, and a digital signature of the rest of the content of the token.

The client device 110 identifies a subset of the frequency filters for which an actual event count for the specified event type corresponding to the frequency filter exceeds the maximum event count defined by the frequency filter (304). Those frequency filters for which an actual event count exceeds the maximum event count defined by the frequency filter can be referred to as triggered frequency filters. As described above, an application 112 of the client device 110 can compare the actual event count over a lookback window corresponding to the specified time duration of the frequency filter to the maximum event count for the frequency filter to determine whether the frequency filter is triggered.

The client device 110 generates a probabilistic data structure that represents at least a portion of the frequency filters in the subset of frequency filters (306). The probabilistic data structure can be a Bloom filter. In some implementations, the application 112 can apply differential privacy to the subset of frequency filters, as described above with reference to step 216 of the process 200 of FIG. 2.

The client device 110 sends, to multiple content providers, a request for content (308). The request for content can include the probabilistic data structure. For example, the request for content can be a request for a digital component for display in a digital component slot of an electronic resource being displayed by the application 112. Each content provider can query the probabilistic data structure to determine whether any of its frequency filters have been triggered at the client device 110 and determine an appropriate response to the request based on whether any of its frequency filters have been triggered at the client device 110. For example, if none of the content provider's frequency filters have been triggered, the content provider may provide the content in response to the request. Conversely, if one or more of the content provider's frequency filters has been triggered, the content provider may refuse, ignore or send content different from the content requested. Such a method therefore uses triggered frequency filters as an indicator of fraud or other negative activity, thereby providing a means for content providers to identify and react to potentially fraudulent activity (by, e.g., not sending the requested content), while maintaining a high level of user data security.

The techniques for using a Bloom filter or other probabilistic data structure along with differential privacy can also be used for other purposes. For example, the Bloom filter and differential privacy can be used for co-click clustering. As the application 112 visits domain D making requests for digital components, notifications of impressions, and/or notification of user interactions, the application can insert the data identifying the domains D into a set S. This set S can be updated for some time interval T. The application 112 can then generate a Bloom filter based on the set S, e.g., with differential privacy as described above with reference to FIG. 2.

Provided that there are a minimum number of domains visited and digital component requests generated, the application 112 can attach the Bloom filter into the next digital component request. The Bloom filter ensures that content providers cannot perform cross-domain tracking on an individual user session with the application 112, e.g., with a browser.

A content provider can then generate a graph or cluster on domains based on received Bloom filters. This information can be used to determine, for example, whether two digital component requests or domains are visited by similar sets of users. For example, the content provider can perform set intersections on the Bloom filter (e.g., via bitwise-AND operation) or some other similarity metric (e.g., Jaccard) over a pair of Bloom filters. This can enable the content provider to determine the similarity between two Bloom filters and therefore the similarity between two digital component requests.

Figure 4:
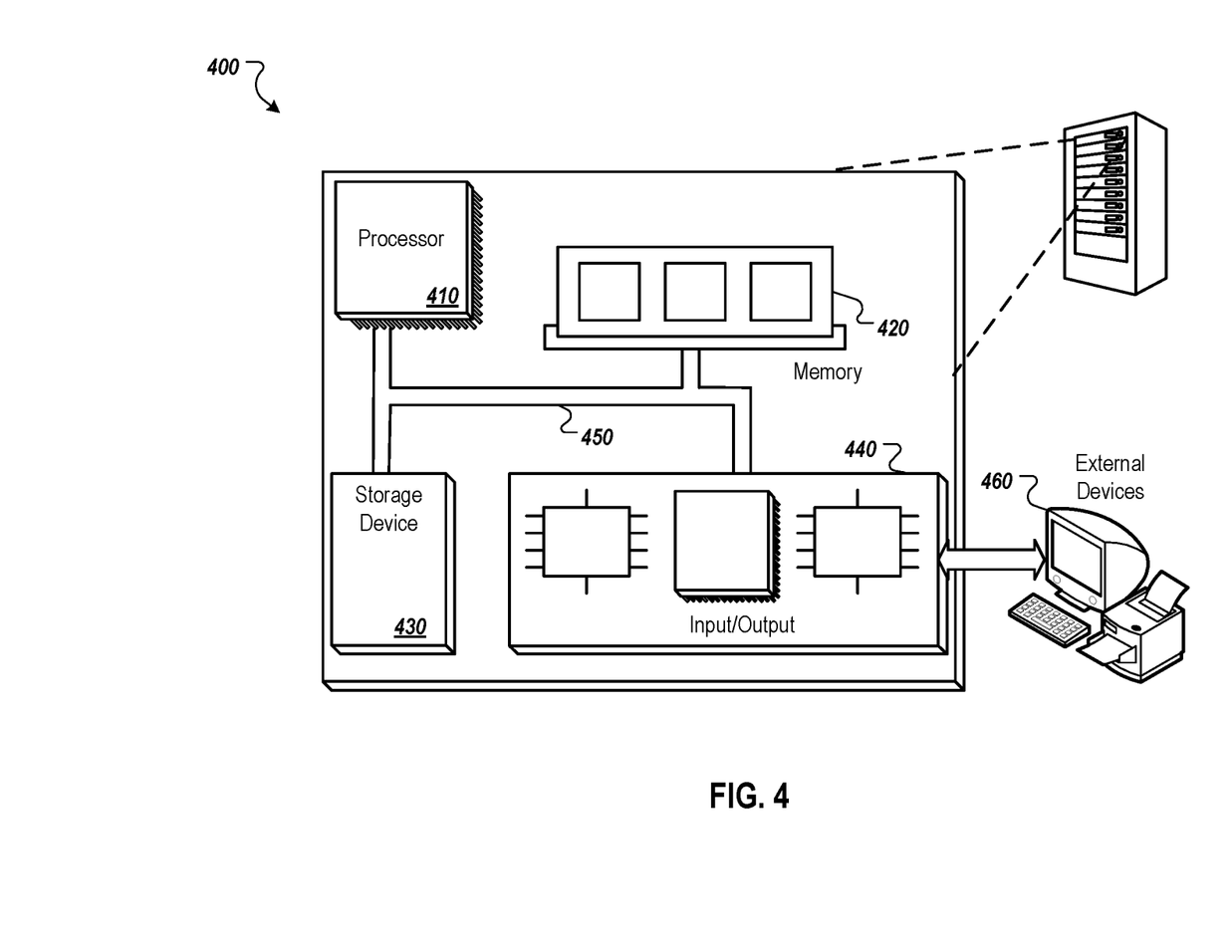
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 500. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    obtaining a set of frequency filters, wherein each frequency filter defines a maximum event count for a specified event type over a specified time duration and corresponds to a respective content provider;
    identifying a subset of the frequency filters as triggered frequency filters for which an actual event count for the specified event type corresponding to the frequency filter exceeds the maximum event count defined by the frequency filter during a time period corresponding to a specified time duration for the frequency filter, wherein the actual event count for the specified event type indicates a number of times an event of the specified event type occurred during the time period;
    generating a probabilistic data structure that represents at least a portion of the frequency filters in the subset of frequency filters; and
    sending, to multiple content providers, a request for content, wherein the request for content comprises the probabilistic data structure.

2. The computer-implemented method of claim 1, wherein:
    the probabilistic data structure comprises a Bloom filter comprising a bit array; and
    generating the probabilistic data structure comprises:
        for each frequency filter in the subset of triggered frequency filters:
            obtaining, for each of one or more hash functions, a bit position for the triggered frequency filter by applying the hash function to a filter identifier for the frequency filter; and
            setting each bit position in the bit array to a value of one.

3. The computer-implemented method of claim 1, wherein obtaining the set of frequency filters comprises receiving, for each frequency filter, an encrypted token generated by encrypting a token that defines a filter identifier for the frequency filter, the maximum event count for the specified event type, and the specified time duration for the frequency filter.

4. The computer-implemented method of claim 3, wherein the filter identifier comprises a byte array that identifies at least one of (i) a digital component corresponding to the specified event type, (ii) a content platform corresponding to the specified event type, or (iii) the specified event type.

5. The computer-implemented method of claim 3, further comprising updating the actual event count for a given frequency filter in the set of frequency filters, the updating comprising:
    obtaining the filter identifier for the given frequency filter in response to an occurrence of the specified event type for the given frequency filter;

initiating an Application Programming Interface (API) call to a web browser API for updating the actual event count for the given frequency filter, wherein the API call comprises the encrypted token for the given frequency filter;

decrypting, by the web browser, the encrypted token; and updating, by the web browser, the actual event count for the given frequency filter.

6. The computer-implemented method of claim 1, further comprising:

detecting, for a given frequency filter, an occurrence of an event of the specified event type defined by the given frequency filter; and updating the actual event count for the given frequency filter.

7. The computer-implemented method of claim 1, wherein generating the probabilistic data structure comprises:

selecting, randomly or pseudorandomly, one or more frequency filters in the subset of triggered frequency filters;

removing a filter identifier for each of the one or more frequency filters from a subset of filter identifiers corresponding to the subset of triggered frequency filters prior to generating the probabilistic data structure; and generating the probabilistic data structure using the subset of filter identifiers.

8. The computer-implemented method of claim 1, wherein generating the probabilistic data structure comprises:

selecting, randomly or pseudorandomly, one or more frequency filters that are not in the subset of triggered frequency filters;

adding a filter identifier for each of the one or more frequency filters to a subset of filter identifiers corresponding to the subset of triggered frequency filters prior to generating the probabilistic data structure; and generating the probabilistic data structure using the subset of filter identifiers.

9. The computer-implemented method of claim 1, wherein generating the probabilistic data structure comprises:

selecting, randomly or pseudorandomly, one or more first frequency filters in the subset of triggered frequency filters;

selecting, randomly or pseudorandomly, one or more second frequency filters that are not in the subset of triggered frequency filters;

prior to generating the probabilistic data structure:

removing a filter identifier for each of the one or more first frequency filters from a subset of filter identifiers corresponding to the subset of triggered frequency filters; and adding a filter identifier for each of the one or more second frequency filters to the subset of triggered frequency filters prior to generating the probabilistic data structure; and generating the probabilistic data structure using the subset of filter identifiers.

10. The computer-implemented method of claim 1, further comprising determining a similarity between the probabilistic data structure and a second probabilistic data structure by performing set intersections on the probabilistic data structure and the second probabilistic data structure.

11. The computer-implemented method of claim 1, further comprising:

receiving, by a content provider of the multiple content providers, the request for content comprising the probabilistic data structure; and determining, by the content provider, a response to the request based on the probabilistic data structure, wherein if it is determined that one or more of the triggered frequency filters corresponds to a frequency filter of the content provider, not providing the requested content.

12. A non-transitory computer-readable medium comprising instructions that, when executed by a processor, cause the processor to perform operations comprising:

obtaining a set of frequency filters, wherein each frequency filter defines a maximum event count for a specified event type over a specified time duration and corresponds to a respective content provider;

identifying a subset of the frequency filters as triggered frequency filters for which an actual event count for the specified event type corresponding to the frequency filter exceeds the maximum event count defined by the frequency filter during a time period corresponding to a specified time duration for the frequency filter, wherein the actual event count for the specified event type indicates a number of times an event of the specified event type occurred during the time period;

generating a probabilistic data structure that represents at least a portion of the frequency filters in the subset of frequency filters; and sending, to multiple content providers, a request for content, wherein the request for content comprises the probabilistic data structure.

13. A system comprising:

one or more processors; and one or more storage devices storing instructions that, when executed by the one or more processors, cause the one or more processor to perform operations comprising:

obtaining a set of frequency filters, wherein each frequency filter defines a maximum event count for a specified event type over a specified time duration and corresponds to a respective content provider;

identifying a subset of the frequency filters as triggered frequency filters for which an actual event count for the specified event type corresponding to the frequency filter exceeds the maximum event count defined by the frequency filter during a time period corresponding to a specified time duration for the frequency filter, wherein the actual event count for the specified event type indicates a number of times an event of the specified event type occurred during the time period;

generating a probabilistic data structure that represents at least a portion of the frequency filters in the subset of frequency filters; and sending, to multiple content providers, a request for content, wherein the request for content comprises the probabilistic data structure.

14. The system of claim 13, wherein:

the probabilistic data structure comprises a Bloom filter comprising a bit array; and generating the probabilistic data structure comprises:

for each frequency filter in the subset of triggered frequency filters:

obtaining, for each of one or more hash functions, a bit position for the triggered frequency filter by applying the hash function to a filter identifier for the frequency filter; and setting each bit position in the bit array to a value of one.

15. The system of claim 13, wherein obtaining the set of frequency filters comprises receiving, for each frequency filter, an encrypted token generated by encrypting a token that defines a filter identifier for the frequency filter, the maximum event count for the specified event type, and the specified time duration for the frequency filter.

16. The system of claim 15, wherein the filter identifier comprises a byte array that identifies at least one of (i) a digital component corresponding to the specified event type, (ii) a content platform corresponding to the specified event type, or (iii) the specified event type.

17. The system of claim 15, wherein the operations comprise updating the actual event count for a given frequency filter in the set of frequency filters, the updating comprising:
  obtaining the filter identifier for the given frequency filter in response to an occurrence of the specified event type for the given frequency filter;
  initiating an Application Programming Interface (API) call to a web browser API for updating the actual event count for the given frequency filter, wherein the API call comprises the encrypted token for the given frequency filter;
  decrypting, by the web browser, the encrypted token; and
  updating, by the web browser, the actual event count for the given frequency filter.

18. The system of claim 13, wherein the operations comprise:
  detecting, for a given frequency filter, an occurrence of an event of the specified event type defined by the given frequency filter; and
  updating the actual event count for the given frequency filter.

19. The system of claim 13, wherein generating the probabilistic data structure comprises:
  selecting, randomly or pseudorandomly, one or more frequency filters in the subset of triggered frequency filters;
  removing a filter identifier for each of the one or more frequency filters from a subset of filter identifiers corresponding to the subset of triggered frequency filters prior to generating the probabilistic data structure; and
  generating the probabilistic data structure using the subset of filter identifiers.

20. The system of claim 13, wherein generating the probabilistic data structure comprises:
  selecting, randomly or pseudorandomly, one or more frequency filters that are not in the subset of triggered frequency filters;
  adding a filter identifier for each of the one or more frequency filters to a subset of filter identifiers corresponding to the subset of triggered frequency filters prior to generating the probabilistic data structure; and
  generating the probabilistic data structure using the subset of filter identifiers.

* * * * *